United States Patent
Chen et al.

(10) Patent No.: US 11,689,785 B2
(45) Date of Patent: Jun. 27, 2023

(54) DUAL-SPECTRUM IMAGE AUTOMATIC EXPOSURE METHOD AND APPARATUS, AND DUAL-SPECTRUM IMAGE CAMERA AND MACHINE STORAGE MEDIUM

(71) Applicant: ZHEJIANG UNIVIEW TECHNOLOGIES CO., LTD., Zhejiang (CN)

(72) Inventors: Yulin Chen, Zhejiang (CN); Yue Sun, Zhejiang (CN)

(73) Assignee: ZHEJIANG UNIVIEW TECHNOLOGIES CO., LTD., Zhejiang (CN)

( * ) Notice: Subject to any disclaimer, the term of this patent is extended or adjusted under 35 U.S.C. 154(b) by 338 days.

(21) Appl. No.: 17/271,407

(22) PCT Filed: Sep. 14, 2018

(86) PCT No.: PCT/CN2018/105802
§ 371 (c)(1),
(2) Date: Feb. 25, 2021

(87) PCT Pub. No.: WO2020/051898
PCT Pub. Date: Mar. 19, 2020

(65) Prior Publication Data
US 2021/0314501 A1    Oct. 7, 2021

(51) Int. Cl.
*H04N 23/72* (2023.01)
*H04N 23/12* (2023.01)
(Continued)

(52) U.S. Cl.
CPC .............. *H04N 23/11* (2023.01); *H04N 23/12* (2023.01); *H04N 23/667* (2023.01); *H04N 23/71* (2023.01); *H04N 23/72* (2023.01)

(58) Field of Classification Search
CPC ...... H04N 23/11; H04N 23/12; H04N 23/667; H04N 23/71; H04N 23/72; H04N 23/73;
(Continued)

(56) References Cited

U.S. PATENT DOCUMENTS

2012/0147243 A1   6/2012   Townsend et al.
2017/0111562 A1*  4/2017   Nakamura .............. H04N 23/12
(Continued)

FOREIGN PATENT DOCUMENTS

CN        103220534 A      7/2013
CN        105554485 A      5/2016
(Continued)

OTHER PUBLICATIONS

Chinese Office Action issued from the Chinese Patent Office to CN Application No. 201880096822.0 dated Nov. 12, 2021, 9 pages.
(Continued)

*Primary Examiner* — Daniel M Pasiewicz
(74) *Attorney, Agent, or Firm* — Hunton Andrews Kurth LLP (57) ABSTRACT

Provided are a dual-spectrum image automatic exposure method and apparatus, and a dual-spectrum image camera. This method includes acquiring an original image collected by the image sensor; performing logical light splitting processing on the original image to obtain an infrared image and a visible light image; determining whether to use infrared cutoff filter; if it is determined to use the infrared cutoff filter, performing exposure processing on the visible light image by using a single-spectrum exposure algorithm to obtain a visible light image that conforms to a target exposure effect; and if it is determined not to use the infrared cutoff filter, performing the exposure processing on the infrared image and the visible light image by using a dual-spectrum exposure algorithm to obtain a visible light
(Continued)

image that conforms to a first exposure effect and an infrared image that conforms to a second exposure effect.

20 Claims, 4 Drawing Sheets

(51) Int. Cl.
*H04N 23/667* (2023.01)
*H04N 23/71* (2023.01)
*H04N 23/11* (2023.01)

(58) Field of Classification Search
CPC ...... H04N 23/74; H04N 23/741; H04N 23/75; H04N 23/76
See application file for complete search history.

(56) References Cited

U.S. PATENT DOCUMENTS

2017/0330053 A1  11/2017  Park et al.
2017/0374282 A1* 12/2017  Naruse ................... G03B 15/00
2019/0364187 A1* 11/2019  Kawasaki .............. H04N 23/71

FOREIGN PATENT DOCUMENTS

| CN | 106060364 A | 10/2016 |
| CN | 107197170 A | 9/2017 |
| CN | 107370917 A | 11/2017 |
| CN | 107438170 A | 12/2017 |
| CN | 108377340 A | 8/2018 |
| EP | 2471258 A1 | 7/2012 |
| WO | 2011023224 A1 | 3/2011 |
| WO | 2017202061 A1 | 11/2017 |

OTHER PUBLICATIONS

International Search Report issued from the International Search Authority to International Application No. PCT/CN2018/105802 dated May 29, 2019, 4 pages.

Extended European Search Report, issued from the European Patent Office, to EP Application No. 18933406.3 dated Feb. 17, 2022, 11 pages.

* cited by examiner

DUAL-SPECTRUM IMAGE AUTOMATIC EXPOSURE METHOD AND APPARATUS, AND DUAL-SPECTRUM IMAGE CAMERA AND MACHINE STORAGE MEDIUM

This application is a U.S. National Stage Application of PCT Application Serial No. PCT/CN2018/105802, filed Sep. 14, 2018, the disclosure of which is incorporated herein by reference in its entirety.

TECHNICAL FIELD

This application relates to the technical field of a camera, in particular, a dual-spectrum image automatic exposure method and apparatus, a dual-spectrum image camera, and a machine storage medium.

BACKGROUND

The traditional color camera can only collect information in the visible light band and use the information in the visible light band for imaging. In severe scenarios such as low illuminance and haze, as the intensity of visible light decreases or scenario information is blocked, color image effects such as the signal-to-noise ratio and visibility obtained by the imaging of the traditional color camera are significantly degraded. In these scenarios, a clear infrared image with a high signal-to-noise ratio can be obtained through proper exposure control. However, the infrared image has only grayscale information and no color information. Therefore, in severe scenarios such as low illuminance and haze, the satisfactory imaging effect cannot be achieved by only using the visible light band or the infrared band for imaging.

Based on this, a dual-spectrum image camera (also referred to as a dual-spectrum camera) comes into being. The traditional dual-spectrum camera generally uses a dual-sensor. That is, the traditional dual-spectrum camera simultaneously collects an infrared image and a visible light image in the same scenario by using an infrared sensor and a visible light sensor, respectively, and then effectively fuses the infrared image and the visible light image by using image fusion technology to obtain a high-quality color fusion image. However, in this solution, logical light splitting is generally performed by using a dual-lens or a single-lens with relatively complex hardware process and configuration, so as to separate infrared light and visible light, and imaging is performed on the infrared sensor and the visible light sensor separately, and then the conventional exposure control is performed on the image formed by fusing the infrared image and the visible light image. In this manner, a fusion image that conforms to requirements can be obtained. The hardware cost of the traditional dual-spectrum camera is usually high. For this, a single-sensor dual-spectrum camera has been initially proposed. However, the current single-sensor dual-spectrum camera just uses the same conventional exposure control manner as the traditional dual-spectrum camera, and the image effect after exposure processing is not good. An effective exposure control manner for the single-sensor dual-spectrum camera has not yet been proposed.

SUMMARY

In view of this, the objects of this application include, for example, to provide a dual-spectrum image automatic exposure method and apparatus, a dual-spectrum image camera, and a machine storage medium, and provide an effective exposure control manner for a single-sensor dual-spectrum camera, which is conducive to obtaining an image with a better exposure effect.

To achieve at least one object of this application, the solution adopted in an embodiment of this application is described below.

According to the first aspect, an embodiment of this application provides a dual-spectrum image automatic exposure method. The method is applied to a dual-spectrum image camera. The dual-spectrum image camera includes one image sensor and a processor that are connected in sequence. The dual-spectrum image camera is further provided with an infrared cutoff filter. The method is performed by the processor. The method includes acquiring an original image collected by the image sensor; performing logical light splitting processing on the original image to obtain an infrared image and a visible light image; determining whether to use the infrared cutoff filter currently; if it is determined to use the infrared cutoff filter, performing exposure processing on the visible light image by using a single-spectrum exposure algorithm to obtain a visible light image that conforms to a target exposure effect; and if it is determined that the infrared cutoff filter is not to used, performing the exposure processing on the infrared image and the visible light image by using a dual-spectrum exposure algorithm to obtain a visible light image that conforms to a first exposure effect and an infrared image that conforms to a second exposure effect. The first exposure effect is the same as or different from the target exposure effect.

In an embodiment of this application, the determining whether to use the infrared cutoff filter includes determining whether a current ambient brightness is greater than a preset brightness; in response to the current ambient brightness being greater than the preset brightness, determining to use the infrared cutoff filter; and in response to the current ambient brightness being not greater than the preset brightness, determining not to use the infrared cutoff filter.

In an embodiment of this application, the performing the exposure processing on the infrared image and the visible light image by using the dual-spectrum exposure algorithm includes acquiring a first brightness value of the visible light image and a second brightness value of the infrared image; acquiring a first target exposure value of the visible light image and a second target exposure value of the infrared image; calculating a first exposure parameter of the visible light image according to the first brightness value and the first target exposure value; calculating a second exposure parameter of the infrared image according to the second brightness value and the second target exposure value; and performing the exposure processing on the visible light image and the infrared image according to the first exposure parameter and the second exposure parameter.

In an embodiment of this application, the calculating the first exposure parameter of the visible light image according to the first brightness value and the first target exposure value includes according to a difference between the first brightness value and the first target exposure value, searching a preset first difference comparison table to determine the first exposure parameter of the visible light image. The calculating the second exposure parameter of the infrared image according to the second brightness value and the second target exposure value includes according to a difference between the second brightness value and the second target exposure value, searching a preset second difference comparison table to determine the second exposure parameter of the infrared image. The first difference comparison table is the same as or different from the second difference comparison table.

In an embodiment of this application, the first exposure parameter includes a first shutter value, a first sensor gain, and a first ISP gain; and the second exposure parameter includes a second shutter value, a second sensor gain, and a second ISP gain.

In an embodiment of this application, the dual-spectrum image camera is further provided with a white light lamp and an infrared lamp; the first exposure parameter further includes a white light lamp intensity; and the second exposure parameter further includes an infrared lamp intensity.

In an embodiment of this application, the performing the exposure processing on the visible light image and the infrared image according to the first exposure parameter and the second exposure parameter includes determining an effective shutter value shared by the visible light image and the infrared image according to the first shutter value and the second shutter value; determining an effective sensor gain shared by the visible light image and the infrared image according to the first sensor gain and the second sensor gain; performing the exposure processing on the visible light image according to the effective shutter value, the effective sensor gain, the first ISP gain, and the white light lamp intensity; and performing the exposure processing on the infrared image according to the effective shutter value, the effective sensor gain, the second ISP gain, and the infrared lamp intensity.

In an embodiment of this application, the determining the effective shutter value shared by the visible light image and the infrared image according to the first shutter value and the second shutter value includes selecting a minimum value of the first shutter value and the second shutter value, and determining the selected minimum value as the effective shutter value shared by the visible light image and the infrared image; alternatively, selecting a maximum value of the first shutter value and the second shutter value, and determining the selected maximum value as the effective shutter value shared by the visible light image and the infrared image; alternatively, calculating an average value of the first shutter value and the second shutter value, and determining the average value as the effective shutter value shared by the visible light image and the infrared image; alternatively, calculating a weighted shutter value of the first shutter value and the second shutter value by using a preset weighting algorithm, and determining the weighted shutter value as the effective shutter value shared by the visible light image and the infrared image.

In an embodiment of this application, the determining the effective sensor gain shared by the visible light image and the infrared image according to the first sensor gain and the second sensor gain includes selecting a minimum value of the first sensor gain and the second sensor gain, and determining the selected minimum value as the effective sensor gain shared by the visible light image and the infrared image; alternatively, selecting a maximum value of the first sensor gain and the second sensor gain, and determining the selected maximum value as the effective sensor gain shared by the visible light image and the infrared image; alternatively, calculating an average value of the first sensor gain and the second sensor gain, and determining the average value as the effective sensor gain shared by the visible light image and the infrared image; alternatively, calculating a weighted gain of the first sensor gain and the second sensor gain by using a preset weighting algorithm, and determining the weighted gain as the effective sensor gain shared by the visible light image and the infrared image.

In an embodiment of this application, the performing the exposure processing on the visible light image according to the effective shutter value, the effective sensor gain, the first ISP gain, and the white light lamp intensity includes presetting a first control sequence of the effective shutter value, the effective sensor gain, the first ISP gain, and the white light lamp intensity, and sequentially performing the exposure processing on the visible light image according to the first control sequence until the visible light image conforms to the first exposure effect. The performing the exposure processing on the infrared image according to the effective shutter value, the effective sensor gain, the second ISP gain, and the infrared lamp intensity includes presetting a second control sequence of the effective shutter value, the effective sensor gain, the second ISP gain, and the infrared lamp intensity, and sequentially performing the exposure processing on the infrared image according to the second control sequence until the infrared image conforms to the second exposure effect.

In an embodiment of this application, the first exposure effect is that a difference between an image brightness value of the visible light image subjected to the exposure processing and the first target exposure value of the visible light image is less than a preset first threshold; and the second exposure effect is that a difference between an image brightness value of the infrared image subjected to the exposure processing and the second target exposure value of the infrared image is less than a preset second threshold.

According to the second aspect, an embodiment of this application further provides a dual-spectrum image automatic exposure apparatus. The apparatus is applied to a dual-spectrum image camera. The dual-spectrum image camera includes one image sensor and a processor that are connected in sequence. The dual-spectrum image camera is further provided with an infrared cutoff filter. The apparatus is disposed in the processor. The apparatus includes an original image acquisition module, a logical light splitting module, a filter determination module, a single-spectrum exposure control module, and a dual-spectrum exposure control module. The original image acquisition module is configured to acquire an original image collected by the image sensor. The logical light splitting module is configured to perform logical light splitting processing on the original image to obtain an infrared image and a visible light image. The filter determination module is configured to determine whether to use the infrared cutoff filter. The single-spectrum exposure control module is configured to, if it is determined to use the infrared cutoff filter, perform exposure processing on the visible light image by using a single-spectrum exposure algorithm to obtain a visible light image that conforms to a target exposure effect. The dual-spectrum exposure control module is configured to, if it is determined not to use the infrared cutoff filter, perform the exposure processing on the infrared image and the visible light image by using a dual-spectrum exposure algorithm to obtain a visible light image that conforms to a first exposure effect and an infrared image that conforms to a second exposure effect. The first exposure effect is the same as or different from the target exposure effect.

In an embodiment of this application, the filter determination module is configured to determine whether a current ambient brightness is greater than a preset brightness; when the current ambient brightness is greater than the preset brightness, to determine to use the infrared cutoff filter; and when the current ambient brightness is not greater than the preset brightness, to determine not to use the infrared cutoff filter.

In an embodiment of this application, the dual-spectrum exposure control module is configured to acquire a first brightness value of the visible light image and a second brightness value of the infrared image; to acquire a first target exposure value of the visible light image and a second target exposure value of the infrared image; to calculate a first exposure parameter of the visible light image according to the first brightness value and the first target exposure value; to calculate a second exposure parameter of the infrared image according to the second brightness value and the second target exposure value; and to perform the exposure processing on the visible light image and the infrared image according to the first exposure parameter and the second exposure parameter.

According to the third aspect, an embodiment of this application provides a dual-spectrum image camera. The dual-spectrum image camera includes one image sensor and a processor that are connected in sequence. The dual-spectrum image camera is further provided with an infrared cutoff filter. The processor is provided with the dual-spectrum image automatic exposure apparatus of any one of the second aspect.

In an embodiment of this application, a lens is further provided before the image sensor. The lens is an infrared confocal lens.

In an embodiment of this application, a light transmittance of the lens is greater than a preset light transmittance.

In an embodiment of this application, the processor is further connected to a light filling device. The light filling device includes at least one of an infrared light filling lamp or a white light filling lamp.

In an embodiment of this application, the image sensor is an RGB-IR sensor.

According to the fourth aspect, an embodiment of this application provides a machine storage medium. The machine-readable storage medium stores machine-executable instructions, and when the machine-executable instructions are called and executed by a processor, the machine-executable instructions are configured to cause the processor to perform the method of any one of the first aspect.

Embodiments of this application provide a dual-spectrum image automatic exposure method and apparatus, a dual-spectrum image camera, and a machine storage medium. In this manner, logical light splitting processing can be performed on the original image collected by the single sensor of the dual-spectrum image camera so that an infrared image and a visible light image can be obtained. Moreover, in the case where an infrared cutoff filter is used, exposure processing can be performed on the visible light image by using a single-spectrum exposure algorithm; and in the case where it is determined not to use the infrared cutoff filter, the exposure processing can be performed on the infrared image and the visible light image by using a dual-spectrum exposure algorithm. This method enables the single-sensor-based dual-spectrum image camera to perform effective exposure processing on the image, and select different exposure algorithms according to the use of the infrared filter, so as to better improve the image exposure effect.

Other features and advantages of embodiments of this application will be described in the following specification, or some of the features and advantages can be inferred from the specification or determined without doubt or can be learned by implementing the preceding technology of this application.

The object, features, and advantages of this application will be more apparent from the detailed description of the preferred embodiments in conjunction with the drawings.

BRIEF DESCRIPTION OF DRAWINGS

To illustrate the solutions in specific embodiments of this application or the solutions in the existing art more clearly, drawings used in the description of the specific embodiments or the existing art will be briefly described below. Apparently, the drawings described below illustrate part of the embodiments of this application, and those of ordinary skill in the art may obtain other drawings based on the drawings described below on the premise that no creative work is done.

DETAILED DESCRIPTION

To illustrate the object, solution, and advantages of embodiments of this application more clearly, the technical solutions of this application will be described clearly and completely in conjunction with drawings. Apparently, the embodiments described below are part, not all, of embodiments of this application. Based on the embodiments in this application, all other embodiments obtained by those of ordinary skill in the art without creative work are within the scope of this application.

A dual-sensor-based dual-spectrum image camera has a relatively high cost, while the single-sensor-based dual-spectrum image camera with a relatively low cost currently only uses the traditional exposure control manner, and the exposure effect of the single-sensor-based dual-spectrum image camera is not good. In view of the preceding problem, to improve this problem, embodiments of this application provide a dual-spectrum image automatic exposure method and apparatus, a dual-spectrum image camera, and a machine storage medium. Embodiments of this application are described in detail below.

To better understand the solutions of embodiments of this application, first, the dual-spectrum image camera (also referred to as the dual-spectrum image camera system) proposed in an embodiment of this application is described below.

The dual-spectrum image camera provided in an embodiment of this application includes at least an image sensor and a processor, the image sensor and the processor are connected in sequence, and one image sensor is provided. Therefore, the dual-spectrum image camera provided in an embodiment of this application may also be referred to as a single-sensor-based dual-spectrum image camera. The dual-spectrum image camera is further provided with an infrared cutoff filter. The processor in the dual-spectrum image camera can execute the dual-spectrum image automatic exposure method proposed in an embodiment of this application. Alternatively, the dual-spectrum image camera is provided with a dual-spectrum image automatic exposure apparatus provided in an embodiment of this application.

Figure 1:
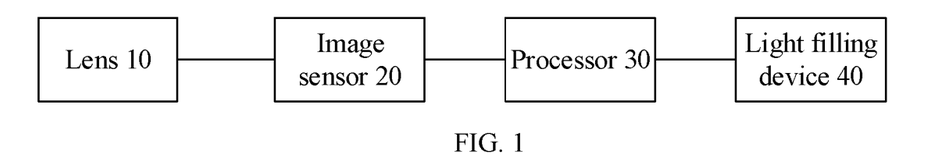
FIG. 1 is a structure diagram of a dual-spectrum image camera according to an embodiment of this application.

For ease of understanding, referring to the structure diagram of a dual-spectrum image camera shown in FIG. 1. FIG. 1 illustrates a lens 10, an image sensor 20, a processor 30, and a light filling device 40 that are connected in sequence.

In descriptions of the lens 10, the dual-spectrum image camera provided in an embodiment of this application has relatively simple requirements for the lens. The lens should be an infrared confocal lens, and further, the light transmittance of the lens may be greater than the preset light transmittance. In an embodiment, the lens has better light transmittance with respect to visible light and near-infrared light. The infrared confocal lens can ensure that both the visible light image and the infrared image can be clearly imaged on the same focal plane.

In descriptions of the image sensor 20, the image sensor may be a single conventional RGB-IR sensor. The RGB-IR sensor has the ability to integrate the visible light image and the infrared image. With respect to the visible light image, the RGB-IR sensor also has advantages such as a relatively high signal-to-noise ratio, good transparency, and a good color reproduction effect. By using the RGB-IR sensor, in conjunction with the exposure control method provided in an embodiment of this application, the infrared images and the visible light images in different scenarios can have a better imaging effect.

In descriptions of the processor 30, the processor 30 may be implemented in at least one of hardware forms such as a digital signal processor (DSP), a field-programmable gate array (FPGA), or a programmable logic array (PLA); or one or a combination of several of a central processing unit (CPU), a graphics processing unit (GPU), or other forms of processing devices with data processing capabilities and/or instruction execution capabilities. The processor 30 can control other components (such as an image sensor or a light filling device) of the dual-spectrum image camera to perform the desired function.

Figure 2:
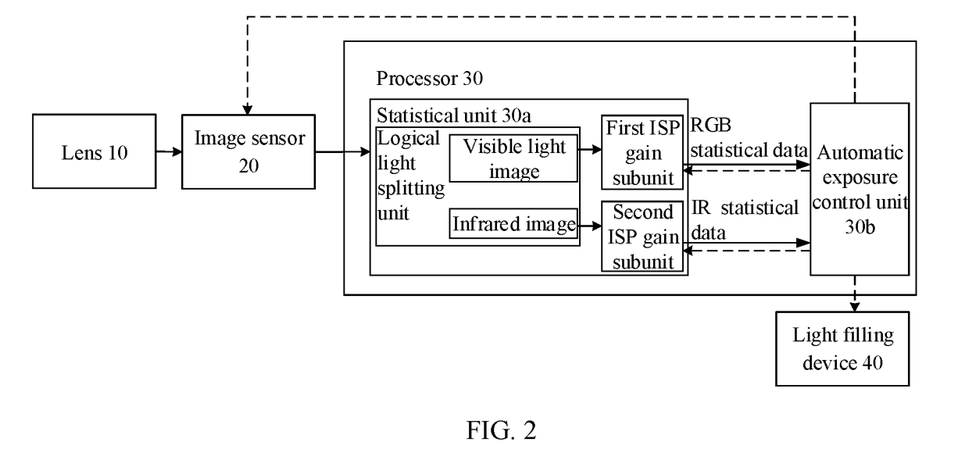
FIG. 2 is a structure diagram of another dual-spectrum image camera according to an embodiment of this application.

In an embodiment, FIG. 2 shows the structure diagram of another dual-spectrum image. Based on FIG. 1, FIG. 2 further illustrates that the processor 30 includes a statistical unit 30a and an automatic exposure control unit 30b.

The statistical unit 30a includes a logical light splitting subunit, a first ISP gain subunit, and a second ISP gain subunit, and the original image data is converted into the RGB statistical data and IR statistical data after being processed by the logical light splitting and the ISP gain processing. The logical light splitting subunit mainly converts the original image output from the RGB-IR sensor into an infrared gray image (hereinafter referred to as an infrared image) and a visible light color image (hereinafter referred to as a visible light image). The first ISP gain subunit is configured to perform the digital signal amplification on the visible light image so as to mainly increase the overall brightness of the visible light image, and the second ISP gain subunit is configured to perform the digital signal amplification on the infrared image so as to mainly increase the overall brightness of the infrared image. It can be seen from FIG. 2 that the dual-spectrum image camera provided in an embodiment of this application supports separate processing of the infrared image and the visible light image. In an embodiment, the statistical unit 30a may be implemented by programming with logic devices such as an FPGA, a DSP, and a CPU.

The automatic exposure control unit 30b may determine the exposure parameters of the visible light image and the infrared image based on the RGB statistical data and IR statistical data. In an embodiment, the automatic control unit 30 b may adopt the dual-spectrum exposure control strategy or the single-spectrum exposure control strategy according to the actual situation (such as whether to use the infrared cutoff filter). In an embodiment, the automatic exposure control unit may separately control part of exposure parameters of the visible light image and the infrared image to achieve the dual-channel control of the visible light image and the infrared image. For example, the ISP gain may achieve the dual-channel control though the logic devices such as an FPGA and a DSP, and the light filling intensities may also be separately controlled by an infrared light filling lamp and a white light filling lamp. The dual-spectrum image camera provided in an embodiment of this application uses a single-sensor, and the shutter parameter and the sensor gain in the exposure parameters only take effect on the sensor. Therefore, these parameters need the single-channel common control of the visible light image and the infrared image. The automatic exposure control unit adjusts single-channel exposure parameters (such as the shutter parameter and the sensor gain) and dual-channel exposure parameters (such as the light filling intensity and the ISP gain) to affect the image acquisition data of the RGB-IR sensor, that is, through continuous feedback, control, and adjustment, and finally, the infrared image and the visible light image can achieve the best image effect. In an embodiment, the automatic exposure control unit 30b may be implemented by programming with logic devices such as a CPU.

In descriptions of the light filling device 40, the light filling device may include an infrared light filling lamp and/or a white light filling lamp. In practical applications, the light filling device is not specially limited in an embodiment of this application, and the light filling device may a full-spectrum light filling lamp including the infrared light filling lamp and the white light filling lamp, and of course, may also only be the infrared light filling lamp, which is not limited herein. The processor provided in an embodiment of this application can perform the logical light splitting on the original image to obtain the visible light image and the infrared image. Therefore, it can be ensured that the infrared light filling does not affect the visible light, and the white light filling does not affect the infrared image. Based on this, in a low-light environment, the brightness and imaging effect of the infrared image can be improved through the infrared light filling, and the brightness and imaging effect of the visible light image can be improved through the white light filling. In this manner, it can be ensured that the better quality infrared image and the better quality visible light image can be obtained even in the low-light environment, and thus the final fusion image effect can be improved.

Based on the aforementioned single-sensor-based dual-spectrum image camera, in order to enable the infrared image and the visible light image collected by the RGB-IR sensor to achieve a better image effect, an embodiment of this application further provides a dual-spectrum image automatic exposure method. The dual-spectrum image automatic exposure method is applied to a dual-spectrum image camera. The dual-spectrum image camera includes an image sensor and a processor that are connected in sequence. One image sensor is provided, and the dual-spectrum image camera is further provided with an infrared cutoff filter. The dual-spectrum image automatic exposure method is performed by the processor. With reference to the flowchart of a dual-spectrum image automatic exposure method shown in FIG. 3, the dual-spectrum image automatic exposure method includes the steps described below.

Figure 3:
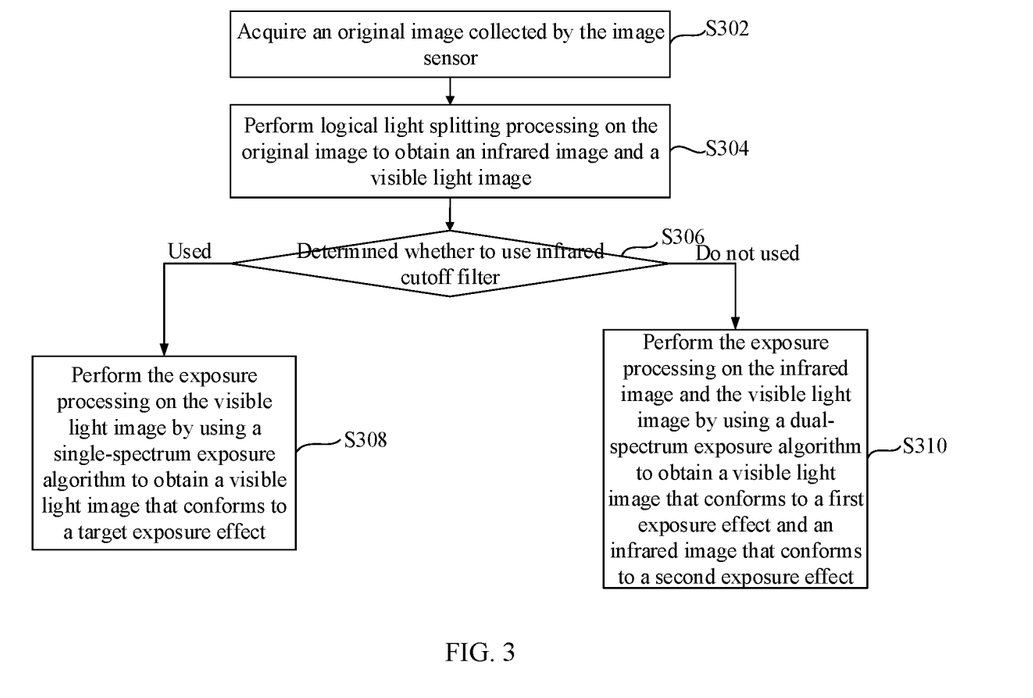
FIG. 3 is a flowchart of a dual-spectrum image automatic exposure method according to an embodiment of this application.

In step S302, an original image collected by the image sensor is acquired. The image sensor may be an RGB-IR sensor.

In step S304, logical light splitting processing is performed on the original image so that an infrared image and a visible light image are obtained. In an implementation, the statistical data of the infrared image and the statistical data of the visible light image may also be obtained separately, and the brightness of the infrared image and the brightness of the visible light image may be calculated separately according to the corresponding statistical data. For example, the image is divided into blocks (divided into a number M×N of blocks), and then the brightness data of each block is counted. The brightness data of the number M×N of blocks is the statistical data of this image.

In step S306, it is determined whether to use the infrared cutoff filter. If it is determined to use the infrared cutoff filter, step S308 is performed; and if it is determined not to use the infrared cutoff filter, step S310 is performed.

In an implementation, it may be determined whether the current ambient brightness is greater than the preset brightness. If the current ambient brightness is greater than the preset brightness, it is determined to use the infrared cutoff filter; and if the current ambient brightness is not greater than the preset brightness, it is determined not to use the infrared cutoff filter. That is, in the case where the environment is relatively bright, it is determined to use the infrared cutoff filter; and in the case where the environment is relatively dark, it is determined not to use the infrared cutoff filter. Further, the state of the current infrared cutoff filter may be determined according to the current gain value. If the current gain value is less than $Gain_{lower-limit}$, it indicates to use the infrared cutoff filter; and if the current gain value is greater than $Gain_{lower-limit}$, it indicates that the infrared cut filter is not used. The current gain value may be obtained according to the conventional gain calculation manner adopted by most cameras. Generally speaking, the current gain value is related to the image brightness value. In an implementation, whether to use the infrared cutoff filter may be implemented by using a filter switch.

In step S308, exposure processing is performed on the visible light image by using a single-spectrum exposure algorithm so that a visible light image that conforms to a target exposure effect is obtained. The single-spectrum exposure algorithm may also be referred to as a single-spectrum exposure control strategy, that is, exposure control is performed mainly with respect to one type of light image (such as a visible light image). It is to be understood that if it is determined to use the infrared cutoff filter, the infrared cutoff filter is able to filter out the infrared light in the ambient light, and thus adjusting the exposure parameters does not affect the infrared image in this case. Therefore, this case is mainly to adjust the visible light image effect.

In step S310, the exposure processing is performed on the infrared image and the visible light image by using a dual-spectrum exposure algorithm so that a visible light image that conforms to a first exposure effect and an infrared image that conforms to a second exposure effect are obtained. It is to be understood that the first exposure effect obtained by processing the visible light image via using the dual-spectrum exposure algorithm is the same as or different from the target exposure effect obtained by processing the visible light image via using the single-spectrum exposure algorithm, which is not limited herein. In practical applications, the target exposure effect, the first exposure effect, and the second exposure effect can be flexibly set according to requirements.

The dual-spectrum exposure algorithm may also be referred to as a dual-spectrum exposure control strategy, that is, the exposure processing is performed mainly with respect to two types of light images (such as an infrared image and a visible light image). It is to be understood that if it is determined to use the infrared cutoff filter, the ambient light entering the RGB-IR sensor includes both infrared light and visible light, so both the infrared image and the visible light image are affected. If the single-spectrum exposure algorithm is used, the image exposure effect of the infrared image and the image exposure effect of the visible light image cannot be taken into account at the same time. Therefore, this embodiment proposes a dual-spectrum exposure algorithm to try to enable the infrared image and the visible light image to achieve better image effects, so as to fuse the infrared image and the visible light image both with better effects and perform display.

In the dual-spectrum image automatic exposure method provided in an embodiment of this application, logical light splitting processing can be performed on the original image collected by the image sensor of the dual-spectrum image camera so that an infrared image and a visible light image can be obtained. Moreover, in the case where an infrared cutoff filter is used, exposure processing is performed on the visible light image by using a single-spectrum exposure algorithm; and in the case where it is determined to use the infrared cutoff filter, the exposure processing is performed on the infrared image and the visible light image by using a dual-spectrum exposure algorithm. This method enables the single-sensor-based dual-spectrum image camera to perform effective exposure processing on the image and select different exposure algorithms according to the use of the infrared filter, so as to better improve the image exposure effect.

In some embodiments, in the case where the exposure processing is performed on the visible light image by using the single-spectrum exposure algorithm, the current image brightness value of this image may be obtained by using a central weight or global light metering method, and whether the exposure is to be adjusted is determined according to the difference between the image brightness value and the preset target exposure value. If the difference between the image brightness value and the preset target exposure value is greater than the preset threshold, then it is determined that the exposure is to be adjusted; otherwise, it is determined that the exposure is not to be adjusted. For details, please refer to the implementation of the conventional auto exposure (AE) algorithm, which is not repeated herein.

Figure 4:
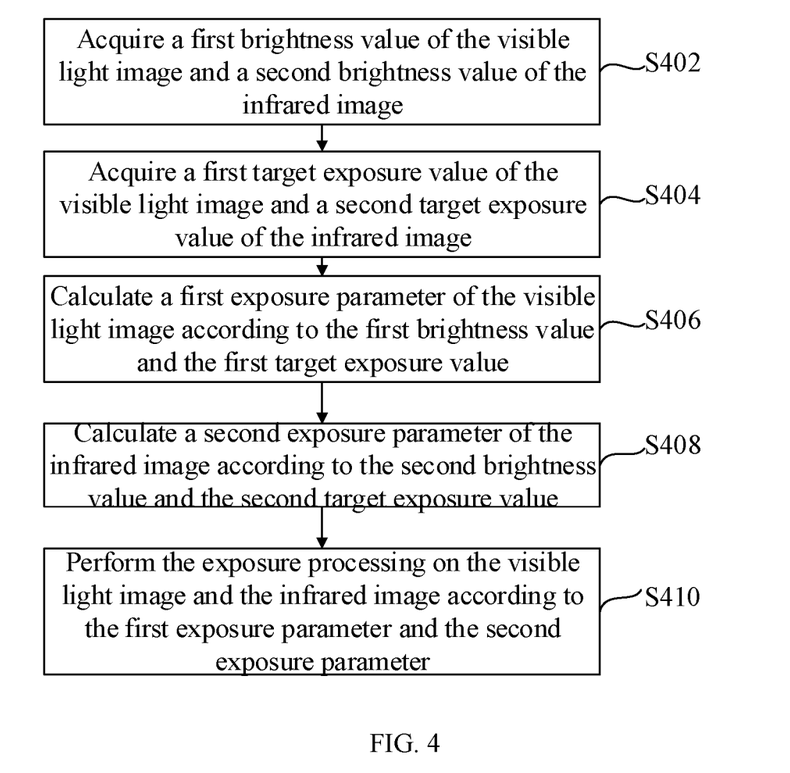
FIG. 4 is a flowchart of a dual-spectrum exposure control method according to an embodiment of this application.

In some embodiments, in the case where the exposure processing is performed on the infrared image and the visible light image by using the dual-spectrum exposure algorithm, refer to the flowchart of a dual-spectrum exposure control method shown in FIG. 4. The method may be performed through the steps described below.

In step S402, a first brightness value of the visible light image and a second brightness value of the infrared image are acquired. In an implementation, the statistical data of the image is firstly obtained, and then the brightness value is calculated based on the statistical data.

In step S404, a first target exposure value of the visible light image and a second target exposure value of the infrared image are acquired. An embodiment of this application provides a method for obtaining the target exposure value. It is assumed that different gain levels are preset to be 0 dB, 6 dB, 12 dB, 18 dB, and so on; according to different gain levels, the target exposure value under different gain levels are preset to be 50, 49, 47, 45, and so on in sequence. The current gain value of the image is obtained, it is determined which gain level the current gain value is in, and then linear interpolation processing is performed on the current gain value, so that the corresponding target exposure value is obtained through calculation. For example, the current gain value is 15 dB, it is calculated as (18−15)/(18−12)×(47−45)+45=46 according to the linear interpolation, then the preset target exposure value corresponding to 15 dB is 46.

In step S406, a first exposure parameter of the visible light image is calculated according to the first brightness value and the first target exposure value. For example, according to the difference between the first brightness value and the first target exposure value, a preset first difference comparison table is searched so that the first exposure parameter of the visible light image is determined.

In step S408, a second exposure parameter of the infrared image is calculated according to the second brightness value and the second target exposure value. For example, according to the difference between the second brightness value and the second target exposure value, a preset second difference comparison table is searched so that the second exposure parameter of the infrared image is determined.

In an implementation, the first difference comparison table in step S406 is the same as or different from the second difference comparison table in step S408.

In step S410, the exposure processing is performed on the visible light image and the infrared image according to the first exposure parameter and the second exposure parameter.

In some embodiments, the first exposure parameter includes a first shutter value, a first sensor gain, and a first ISP gain; and the second exposure parameter includes a second shutter value, a second sensor gain, and a second ISP gain. If the dual-spectrum image camera is further provided with a white light lamp and an infrared lamp, then the first exposure parameter may further include a white light lamp intensity, and the second exposure parameter may further include an infrared lamp intensity. Moreover, the exposure parameters may further include an aperture.

In terms of the ISP gain and the light filling lamp, the dual-spectrum image camera may achieve the dual-channel separate control of the infrared image and the visible light image, and the first ISP gain, the second ISP gain, the white light lamp intensity, and the infrared lamp intensity are calculated separately. In terms of the shutter value and the sensor gain, since the dual-spectrum image camera has only one sensor, only one set of parameters is shared for the calculation of the effective shutter value and the effective sensor gain.

Based on this, in the case where the exposure processing is performed on the visible light image and the infrared image according to the first exposure parameter and the second exposure parameter, the effective shutter value shared by the visible light image and the infrared image can be determined according to the first shutter value and the second shutter value; the effective sensor gain shared by the visible light image and the infrared image can be determined according to the first sensor gain and the second sensor gain; and thus the exposure processing is performed on the visible light image according to the effective shutter value, the effective sensor gain, the first ISP gain, and the white light lamp intensity, and the exposure processing is performed on the infrared image according to the effective shutter value, the effective sensor gain, the second ISP gain, and the infrared lamp intensity. The calculation methods of various exposure parameters are similar. The shutter is used as an example to illustrate the specific calculation process. For example, different shutter sizes corresponding to respective brightness differences (that is, the difference between the image brightness value and the target exposure value of the image) are preset so that the brightness difference comparison table is formed; then the difference between the image brightness value and the target exposure value is calculated; finally, shutter size corresponding to the respective calculated difference can be determined according to the currently calculated difference and the preset brightness difference comparison table.

When determining the effective shutter value shared by the visible light image and the infrared image and the effective sensor gain shared by the visible light image and the infrared image, the adoptable manners are described below.

Manner 1: Minimum Selection Method

A minimum value of the first shutter value and the second shutter value is selected, and the selected minimum value is determined as the effective shutter value shared by the visible light image and the infrared image.

A minimum value of the first sensor gain and the second sensor gain is selected, and the selected minimum value is determined as the effective sensor gain shared by the visible light image and the infrared image.

Manner 2: Maximum Selection Method

A maximum value of the first shutter value and the second shutter value is selected, and the selected maximum value is determined as the effective shutter value shared by the visible light image and the infrared image.

A maximum value of the first sensor gain and the second sensor gain is selected, and the selected maximum value is determined as the effective sensor gain shared by the visible light image and the infrared image.

Manner 3: Average Value Selection Method

An average value of the first shutter value and the second shutter value is selected, and the average value is determined as the effective shutter value shared by the visible light image and the infrared image.

An average value of the first sensor gain and the second sensor gain is selected, and the average value is determined as the effective sensor gain shared by the visible light image and the infrared image.

Manner 4: Weighted Value Selection Method

A weighted shutter value of the first shutter value and the second shutter value is calculated by using a preset weighting algorithm, and the weighted shutter value is determined as the effective shutter value shared by the visible light image and the infrared image.

A weighted gain of the first sensor gain and the second sensor gain is calculated by using a preset weighting algorithm, and the weighted gain is determined as the effective sensor gain shared by the visible light image and the infrared image.

In practical applications, the effective shutter value shared by the visible light image and the infrared image may be flexibly selected from any one of the preceding manners 1 to 4, and the effective sensor gain may also be flexibly selected from any one of the preceding manners 1 to 4; or other calculation manners (not limited to the preceding four manners) may be selected, which is not limited herein. In an embodiment, the manner of selecting the effective shutter value may be the same as or different from the manner of selecting the effective sensor gain.

Considering that the control priority of different exposure parameters has different effects on the imaging effect of the image, therefore, in response to performing the exposure processing on the visible light image according to the effective shutter value, the effective sensor gain, the first ISP gain, and the white light lamp intensity, a first control sequence of the effective shutter value, the effective sensor gain, the first ISP gain, and the white light lamp intensity may be preset, and the exposure processing is sequentially performed on the visible light image according to the first control sequence until the visible light image conforms the first exposure effect. For example, the first exposure effect may be that the difference between the image brightness value of the visible light image subjected to the exposure processing and the first target exposure value of the visible light image is less than the preset first threshold. For example, the first control sequence (also referred to as the first priority sequence) of the visible light image may be the effective shutter value, the effective sensor gain, the first ISP gain, and the white light lamp intensity from first to last.

In response to performing the exposure processing on the infrared image according to the effective shutter value, the effective sensor gain, the second ISP gain, and the infrared lamp intensity, a second control sequence of the effective shutter value, the effective sensor gain, the second ISP gain, and the infrared lamp intensity may be preset, and the exposure processing is sequentially performed on the infrared image according to the second control sequence until the infrared image conforms to the second exposure effect. For example, the second exposure effect may be that the difference between the image brightness value of the infrared image subjected to the exposure processing and the second target exposure value of the infrared image is less than the preset second threshold. For example, the second control sequence (also referred to as the second priority sequence) of the infrared image may be the effective shutter value, the effective sensor gain, the infrared lamp intensity, and the second ISP gain from first to last.

Figure 5:
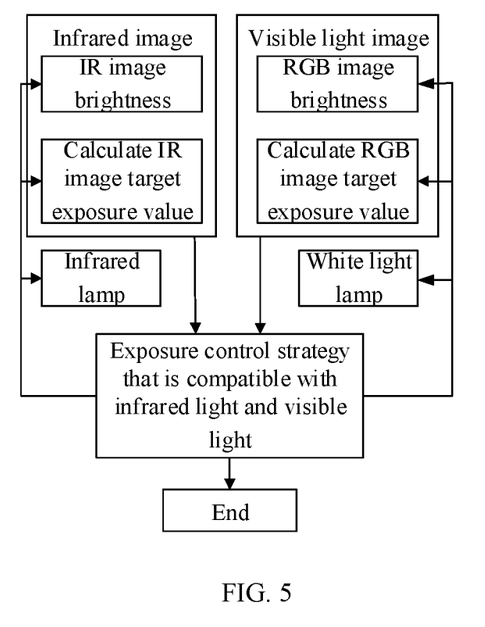
FIG. 5 is a schematic diagram of a dual-spectrum exposure control strategy according to an embodiment of this application.

In the case where the exposure processing is performed on the infrared image and the visible light image by using the dual-spectrum exposure algorithm so that the visible light image that conforms to the first exposure effect and the infrared image that conforms to the second exposure effect are obtained, for ease of understanding, refer to the schematic diagram of a dual-spectrum exposure control strategy shown in FIG. 5. FIG. 5 further illustrates an exposure control strategy that is compatible with infrared light and visible light. The dual-spectrum exposure algorithm may perform the exposure processing on the infrared image and the visible light image based on this strategy, enable the infrared image and the visible light image to conform to the exposure requirements, and achieve the stable exposure (that is, the absolute value of the difference between the image brightness value and the preset target exposure value of the image is less than the preset threshold). Generally speaking, in a low-light environment, the size of the exposure parameter is adjusted from small to large; and in a high-bright environment, the size of the exposure parameter is adjusted from large to small. The exposure parameter adjustment strategy and the calculation manners for different exposure parameters in the low-light environment are similar to that in the high-bright environment. Therefore, the low-light environment is used as an example to explain the adjustment process of exposure parameters in an embodiment of this application. According to the stable exposure state of the infrared image and the visible light image, the example may be divided into four situations described below.

In situation 1, the exposure of the infrared image and the exposure of the visible light image are both unstable, and then the exposure parameter (that is, the aforementioned second exposure parameter) of the infrared image is calculated according to the difference between the image brightness value (that is, the aforementioned second brightness value) of the infrared image and the target exposure value (that is, the aforementioned second target exposure value) of the infrared image, and the exposure parameter (that is, the aforementioned first exposure parameter) of the visible light image is calculated according to the difference between the image brightness value (that is, the aforementioned first brightness value) of the visible light image and the target exposure value (that is, the aforementioned first target exposure value) of the visible light image. In response to the first control sequence of the visible light image being the effective shutter value, the effective sensor gain, the first ISP gain, and the white light lamp intensity from first and last; and in response to the second control sequence of the infrared image being the effective shutter value, the effective sensor gain, the infrared lamp intensity, and the second ISP gain from first to last, an example of the exposure adjustment is described below.

First, the shutter values of the infrared image and the visible light image (that is, the first shutter value and the second shutter value) that need to be adjusted are calculated, and then the effective shutter value is selected based on the first shutter value and the second shutter value. If the exposure of the infrared image and the exposure of the visible light image are both unstable in this case, the shutter value is adjusted continuously to the maximum. If the exposure of the infrared image and the exposure of the visible light image are still unstable in this case, then the gain values of the infrared image and the visible light image (the first sensor gain value and the second sensor gain value) are adjusted, and then the effective sensor gain is selected based on the first sensor gain value and the second sensor gain value. If the exposure of the infrared image and the exposure of the visible light image are still unstable when the infrared image and the visible light image are adjusted to the effective sensor gain, the gain value is adjusted continuously to the maximum. If the exposure of the infrared image and the exposure of the visible light image are still unstable in this case, the infrared lamp intensity is calculated according to the difference between the second brightness value and the second target exposure value of the infrared image. In an embodiment, the infrared lamp intensity may be adjusted in a linear manner. That is, the greater the difference between the image brightness value and the target exposure value is, the greater the adjusted infrared lamp intensity value is. In the case where the infrared lamp intensity is adjusted to the maximum, the exposure of the infrared image is still unstable, and then the second ISP gain of the infrared image is continuously adjusted. The first ISP gain is calculated first according to the difference between the first brightness value and the first target exposure value of the visible light image. If the exposure is still unstable when the image is adjusted to the first ISP gain, the ISP gain value of the visible light image is increased continuously to the maximum. If the exposure is still unstable, the size of the white light lamp intensity is adjusted continuously, which may refer to the adjustment manner of the infrared lamp for details. As long as the exposure of the infrared image and the exposure of the visible light image are both unstable, various exposure parameters are sequentially adjusted according to the respective preset control sequence of the infrared image and the visible light image until the exposure of at least one of the infrared image and the visible light image is adjusted to a stable state.

In situation 2, if the exposure of the visible light image is stable and the exposure of the infrared image is unstable, the exposure parameters of the infrared image are calculated and adjusted continuously according to the image brightness value of the infrared image and the target exposure value of the infrared image until the exposure of the infrared image is stable.

In situation 3, if the exposure of the infrared image is stable and the exposure of the visible light image is unstable, the exposure parameters of the visible light image are calculated and adjusted continuously according to the image brightness value of the visible light image and the target exposure value of the visible light image until the exposure of the visible light image is stable.

In situation 4, the exposure of the infrared image and the exposure of the visible light image are adjusted to the stable state, or all the exposure parameters of the infrared image and all the exposure parameters of the visible light image are adjusted to the maximum, then the exposure adjustment ends.

No matter which of the preceding situations the current stable exposure state of the infrared image and the visible light image belongs to, the exposure state of the infrared image and the visible light image can be adjusted to gradually converge to situation 4, and then the exposure adjustment ends.

To sum up, in the preceding dual-spectrum image automatic exposure method provided in this embodiment, targeted exposure control can be performed on a single-sensor-based dual-spectrum image camera, different automatic exposure control strategies (such as a single-spectrum exposure algorithm or a dual-spectrum exposure algorithm) can be adaptively selected according to the use state of the infrared cutoff filter, and thus the final image obtained by the camera has advantages such as a relatively high signal-to-noise ratio, good transparency, and a good color reproduction effect. Moreover, in the preceding dual-spectrum image automatic exposure method provided in this embodiment, the dual-channel control of the exposure parameters (such as the ISP gain and the light filling lamp) and the common control of the exposure parameters (such as the shutter and the sensor gain) of the infrared image and the visible light image can be achieved through the dual-spectrum exposure algorithm. In this manner, the infrared image and the visible light image can achieve a better image effect in different scenarios. Moreover, the dual-spectrum image camera provided in this embodiment may be further provided with a light filling device. This light filling device may include an infrared lamp and a white light lamp. The dual-channel control of the light filling device can be achieved through the dual-spectrum exposure algorithm. Light filling is performed on the infrared image through the infrared lamp, and light filling is performed on the visible light image through the white light lamp, and thus the image effect of the camera in a low-light environment can be effectively improved.

Corresponding to the aforementioned dual-spectrum image automatic exposure method, this embodiment further provides a dual-spectrum image automatic exposure apparatus. This apparatus is applied to a dual-spectrum image camera. The dual-spectrum image camera includes an image sensor and a processor that are connected in sequence. One image sensor is provided, and the dual-spectrum image camera is further provided with an infrared cutoff filter. The dual-spectrum image automatic exposure apparatus is disposed on the processor side. Refer to the block diagram of an automatic exposure apparatus shown in FIG. 6, the automatic exposure apparatus includes an original image acquisition module 602, a logical light splitting module 604, a filter determination module 606, a single-spectrum exposure control module 608, and a dual-spectrum exposure control module 610.

Figure 6:
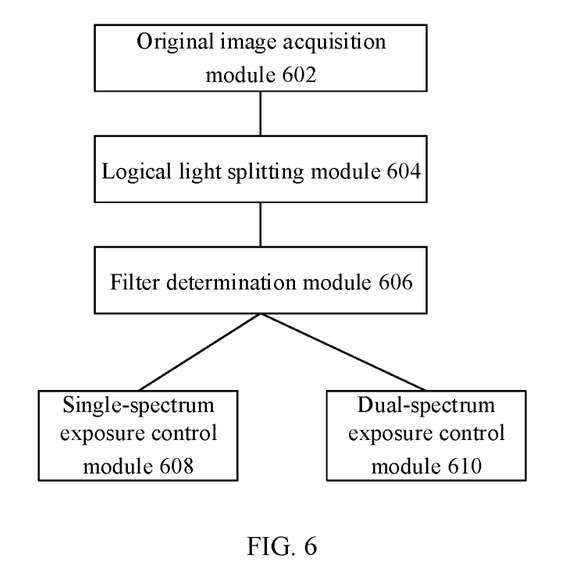
FIG. 6 is a block diagram of an automatic exposure apparatus according to an embodiment of this application.

The original image acquisition module 602 is configured to acquire an original image collected by the image sensor.

The logical light splitting module 604 is configured to perform logical light splitting processing on the original image to obtain an infrared image and a visible light image.

The filter determination module 606 is configured to determine whether the infrared cutoff filter is currently used.

The single-spectrum exposure control module 608 is configured to, if it is determined to use the infrared cutoff filter, perform exposure processing on the visible light image by using a single-spectrum exposure algorithm to obtain a visible light image that conforms to a target exposure effect.

The dual-spectrum exposure control module 610 is configured to, if it is determined not to use the infrared cutoff filter, perform exposure processing on the infrared image and the visible light image by using a dual-spectrum exposure algorithm to obtain a visible light image that conforms to a first exposure effect and an infrared image that conforms to a second exposure effect. The first exposure effect is the same as or different from the target exposure effect.

In the dual-spectrum image automatic exposure apparatus provided in an embodiment of this application, logical light splitting processing can be performed on the original image collected by the image sensor of the dual-spectrum image camera so that an infrared image and a visible light image can be obtained. Moreover, in the case where an infrared cutoff filter is used, exposure processing can be performed on the visible light image by using a single-spectrum exposure algorithm; and in the case where not to use the infrared cutoff filter, the exposure processing can be performed on the infrared image and the visible light image by using a dual-spectrum exposure algorithm. This method enables the single-sensor-based dual-spectrum image camera to perform effective exposure processing on the image, and select different exposure algorithms according to the use of the infrared filter, so as to better improve the image exposure effect.

In an embodiment, the filter determination module is configured to determine whether a current ambient brightness is greater than a preset brightness. If the current ambient brightness is greater than the preset brightness, the filter determination module determines to use the infrared cutoff filter; and if the current ambient brightness is not greater than the preset brightness, the filter determination module determines not to use the infrared cutoff filter.

In an embodiment, the dual-spectrum exposure control module is configured to acquire a first brightness value of the visible light image and a second brightness value of the infrared image. The dual-spectrum exposure control module is configured to acquire a first target exposure value of the visible light image and a second target exposure value of the infrared image. The dual-spectrum exposure control module is configured to calculate a first exposure parameter of the visible light image according to the first brightness value and the first target exposure value. The dual-spectrum exposure control module is configured to calculate a second exposure parameter of the infrared image according to the second brightness value and the second target exposure value. The dual-spectrum exposure control module is configured to perform the exposure processing on the visible light image and the infrared image according to the first exposure parameter and the second exposure parameter. In an implementation, the dual-spectrum exposure control module may be further configured to: according to the difference between the first brightness value and the first target exposure value, search a preset first difference comparison table to determine the first exposure parameter of the visible light image; and according to the difference between the second brightness value and the second target exposure value, search a preset second difference comparison table to determine the second exposure parameter of the infrared image. The first difference comparison table is the same as or different from the second difference comparison table.

For example, the first exposure parameter includes a first shutter value, a first sensor gain, and a first ISP gain; and the second exposure parameter includes a second shutter value, a second sensor gain, and a second ISP gain. If the dual-spectrum image camera is further provided with a white light lamp and an infrared lamp, then the first exposure parameter may further include a white light lamp intensity, and the second exposure parameter may further include an infrared lamp intensity.

In an implementation, the preceding dual-spectrum exposure control module may be further configured to: determine an effective shutter value shared by the visible light image and the infrared image according to the first shutter value and the second shutter value; according to the first sensor gain and the second sensor gain, determine an effective sensor gain shared by the visible light image and the infrared image; according to the effective shutter value, the effective sensor gain, the first ISP gain, and the white light lamp intensity, perform the exposure processing on the visible light image; and according to the effective shutter value, the effective sensor gain, the second ISP gain, and the infrared lamp intensity, perform the exposure processing on the infrared image. The determination manners for the effective shutter value and the effective sensor gain can refer to the aforementioned method embodiment, which is not repeated herein.

The preceding dual-spectrum exposure control module may be further configured to: preset a first control sequence of the effective shutter value, the effective sensor gain, the first ISP gain, and the white light lamp intensity, and sequentially perform the exposure processing on the visible light image according to the first control sequence until the visible light image conforms to the first exposure effect. The preceding dual-spectrum exposure control module may be further configured to: preset a second control sequence of the effective shutter value, the effective sensor gain, the second ISP gain, and the infrared lamp intensity, and sequentially perform the exposure processing on the infrared image according to the second control sequence until the infrared image conforms to the second exposure effect.

The implementation principles and technical effects of the apparatus provided in this embodiment are the same as those of the preceding embodiment. For a brief description, for the parts not mentioned in the apparatus embodiment, please refer to the corresponding content in the preceding method embodiment.

This embodiment further provides a machine storage medium. This machine storage medium stores machine-executable instructions. When the machine-executable instructions are called and executed by a processor, the machine-executable instructions cause the processor to perform the preceding dual-spectrum image automatic exposure method. The machine storage medium is a machine-readable storage medium.

The dual-spectrum image automatic exposure method and apparatus, the dual-spectrum image camera, and the computer program product of the machine storage medium provided in embodiments of this application include a computer-readable storage medium storing program codes, and instructions included in the program codes may be used for performing the method described in the preceding method embodiment. For a specific implementation, please refer to the method embodiment, which is not repeated herein.

Further, in embodiments of this application, unless otherwise expressly specified and limited, terms like "mounted", "connected to each other", "connected" are to be construed in a broad sense, for example, as permanently connected, detachably connected, or integratedly connected; mechanically connected or electrically connected; directly connected or indirectly connected via an intermediate medium; or internally connected between two elements. For those of ordinary skill in the art, specific meanings of the preceding terms in this application may be understood based on specific situations.

The functions may be stored in a computer-readable storage medium if implemented in the form of software function units and sold or used as independent products. Based on this understanding, the solutions provided in this application substantially, the part contributing to the existing art, or part of the solutions, may be embodied in the form of a software product. This computer software product is stored on a storage medium and includes several instructions for enabling a computer device (which may be a personal computer, a server, a network device, or the like) to perform all or part of the steps in the methods provided in embodiments of this application. The preceding storage medium includes a USB flash disk, a mobile hard disk, a read-only memory (ROM), a random-access memory (RAM), a magnetic disk, an optical disk, or another medium capable of storing program codes.

Finally, it is to be noted that the preceding embodiments are only specific embodiments of this application, which are used for illustrating the solutions of this application, rather than limiting the solutions of this application. The protection scope of this application is not limited thereto. Although this application is described in detail with reference to the preceding embodiments, those of ordinary skill in the art should understand that those skilled in the art can still modify or easily conceive changes of the solutions described in the aforementioned embodiments, or make equivalent substitutions of some of the technical features within the technical scope disclosed in this application; and these modifications, changes or substitutions do not cause the essence of the corresponding solutions to deviate from the spirit and scope of the solutions of embodiments of this application, and should be within the protection scope of this application. Therefore, the protection scope of this application is subject to the protection scope of the appended claims.

INDUSTRIAL APPLICABILITY

The solutions of this application are adopted so that the single-sensor-based dual-spectrum image camera can perform effective exposure processing on an image and obtain an image with a better exposure effect.

What is claimed is:

1. A dual-spectrum image automatic exposure method applied to a dual-spectrum image camera, wherein the dual-spectrum image camera comprises one image sensor and a processor that are connected in sequence, wherein the dual-spectrum image camera is further provided with an infrared cutoff filter, and
wherein the method is performed by the processor, and the method comprises:
acquiring an original image collected by the image sensor;
performing logical light splitting processing on the original image to obtain an infrared image and a visible light image;
determining whether to use the infrared cutoff filter currently;
in response to determining to use the infrared cutoff filter, performing exposure processing on the visible light image by using a single-spectrum exposure algorithm to obtain a visible light image that conforms to a target exposure effect; and
in response to determining not to use the infrared cutoff filter, performing the exposure processing on the infrared image and the visible light image by using a dual-spectrum exposure algorithm to obtain a visible light image that conforms to a first exposure effect and an infrared image that conforms to a second exposure effect, wherein the first exposure effect is the same as or different from the target exposure effect.

2. The method of claim 1, wherein the determining whether to use infrared cutoff filter currently comprises:
determining whether a current ambient brightness is greater than a preset brightness; and
in response to the current ambient brightness being greater than the preset brightness, determining to use the infrared cutoff filter; and in response to the current ambient brightness being not greater than the preset brightness, determining not to use the infrared cutoff filter.

3. The method of claim 1, wherein the performing the exposure processing on the infrared image and the visible light image by using the dual-spectrum exposure algorithm comprises:
acquiring a first brightness value of the visible light image and a second brightness value of the infrared image;
acquiring a first target exposure value of the visible light image and a second target exposure value of the infrared image;
calculating a first exposure parameter of the visible light image according to the first brightness value and the first target exposure value;
calculating a second exposure parameter of the infrared image according to the second brightness value and the second target exposure value; and
performing the exposure processing on the visible light image and the infrared image according to the first exposure parameter and the second exposure parameter.

4. The method of claim 3, wherein the calculating the first exposure parameter of the visible light image according to the first brightness value and the first target exposure value comprises:
according to a difference between the first brightness value and the first target exposure value, searching a preset first difference comparison table to determine the first exposure parameter of the visible light image, and
wherein the calculating the second exposure parameter of the infrared image according to the second brightness value and the second target exposure value comprises:
according to a difference between the second brightness value and the second target exposure value, searching a preset second difference comparison table to determine the second exposure parameter of the infrared image,
wherein the first difference comparison table is the same as or different from the second difference comparison table.

5. The method of claim 3, wherein the first exposure parameter comprises a first shutter value, a first sensor gain, and a first ISP gain; and the second exposure parameter comprises a second shutter value, a second sensor gain, and a second ISP gain.

6. The method of claim 5, wherein the dual-spectrum image camera is further provided with a white light lamp and an infrared lamp; the first exposure parameter further comprises a white light lamp intensity; and the second exposure parameter further comprises an infrared lamp intensity.

7. The method of claim 6, wherein the performing the exposure processing on the visible light image and the infrared image according to the first exposure parameter and the second exposure parameter comprises:
determining an effective shutter value shared by the visible light image and the infrared image according to the first shutter value and the second shutter value;
determining an effective sensor gain shared by the visible light image and the infrared image according to the first sensor gain and the second sensor gain;
performing the exposure processing on the visible light image according to the effective shutter value, the effective sensor gain, the first ISP gain, and the white light lamp intensity; and
performing the exposure processing on the infrared image according to the effective shutter value, the effective sensor gain, the second ISP gain, and the infrared lamp intensity.

8. The method of claim 7, wherein the determining the effective shutter value shared by the visible light image and the infrared image according to the first shutter value and the second shutter value comprises:
selecting a minimum value of the first shutter value and the second shutter value, and determining the selected minimum value as the effective shutter value shared by the visible light image and the infrared image; or
selecting a maximum value of the first shutter value and the second shutter value, and determining the selected maximum value as the effective shutter value shared by the visible light image and the infrared image; or
calculating an average value of the first shutter value and the second shutter value, and determining the average value as the effective shutter value shared by the visible light image and the infrared image; or
calculating a weighted shutter value of the first shutter value and the second shutter value by using a preset weighting algorithm, and determining the weighted shutter value as the effective shutter value shared by the visible light image and the infrared image.

9. The method of claim 7, wherein the determining the effective sensor gain shared by the visible light image and the infrared image according to the first sensor gain and the second sensor gain comprises:
selecting a minimum value of the first sensor gain and the second sensor gain, and determining the selected minimum value as the effective sensor gain shared by the visible light image and the infrared image; or
selecting a maximum value of the first sensor gain and the second sensor gain, and determining the selected maximum value as the effective sensor gain shared by the visible light image and the infrared image; or calculating an average value of the first sensor gain and the second sensor gain, and determining the average value as the effective sensor gain shared by the visible light image and the infrared image; or calculating a weighted gain of the first sensor gain and the second sensor gain by using a preset weighting algorithm, and determining the weighted gain as the effective sensor gain shared by the visible light image and the infrared image.

10. The method of claim 7, wherein the performing the exposure processing on the visible light image according to the effective shutter value, the effective sensor gain, the first ISP gain, and the white light lamp intensity comprises:

presetting a first control sequence of the effective shutter value, the effective sensor gain, the first ISP gain, and the white light lamp intensity, and sequentially performing the exposure processing on the visible light image according to the first control sequence until the visible light image conforms to the first exposure effect, and wherein the performing the exposure processing on the infrared image according to the effective shutter value, the effective sensor gain, the second ISP gain, and the infrared lamp intensity comprises:

presetting a second control sequence of the effective shutter value, the effective sensor gain, the second ISP gain, and the infrared lamp intensity, and sequentially performing the exposure processing on the infrared image according to the second control sequence until the infrared image conforms to the second exposure effect.

11. The method of claim 10, wherein the first exposure effect is that a difference between an image brightness value of the visible light image subjected to the exposure processing and the first target exposure value of the visible light image is less than a preset first threshold; and the second exposure effect is that a difference between an image brightness value of the infrared image subjected to the exposure processing and the second target exposure value of the infrared image is less than a preset second threshold.

12. A dual-spectrum image automatic exposure apparatus applied to a dual-spectrum image camera, wherein the dual-spectrum image camera comprises one image sensor and a processor that are connected in sequence, wherein the dual-spectrum image camera is further provided with an infrared cutoff filter, and wherein the apparatus is disposed in the processor, and the apparatus comprises:

an original image acquisition module configured to acquire an original image collected by the image sensor;

a logical light splitting module configured to perform logical light splitting processing on the original image to obtain an infrared image and a visible light image;

a filter determination module configured to determine whether to use infrared cutoff filter;

a single-spectrum exposure control module configured to, if it is determined to use the infrared cutoff filter, perform exposure processing on the visible light image by using a single-spectrum exposure algorithm to obtain a visible light image that conforms to a target exposure effect; and a dual-spectrum exposure control module configured to, if it is determined not to use the infrared cutoff filter, perform the exposure processing on the infrared image and the visible light image by using a dual-spectrum exposure algorithm to obtain a visible light image that conforms to a first exposure effect and an infrared image that conforms to a second exposure effect, wherein the first exposure effect is the same as or different from the target exposure effect.

13. The apparatus of claim 12, wherein the filter determination module is configured to:

determine whether a current ambient brightness is greater than a preset brightness; and when the current ambient brightness is greater than the preset brightness, determine to use the infrared cutoff filter; and when the current ambient brightness is not greater than the preset brightness, determine not to use the infrared cutoff filter.

14. The apparatus of claim 12, wherein the dual-spectrum exposure control module is configured to:

acquire a first brightness value of the visible light image and a second brightness value of the infrared image;

acquire a first target exposure value of the visible light image and a second target exposure value of the infrared image;

calculate a first exposure parameter of the visible light image according to the first brightness value and the first target exposure value;

calculate a second exposure parameter of the infrared image according to the second brightness value and the second target exposure value; and perform the exposure processing on the visible light image and the infrared image according to the first exposure parameter and the second exposure parameter.

15. A dual-spectrum image camera, comprising one image sensor and a processor that are connected in sequence, wherein the dual-spectrum image camera is further provided with an infrared cutoff filter; and the processor is provided with a dual-spectrum image automatic exposure apparatus, wherein the dual-spectrum image camera comprises one image sensor and a processor that are connected in sequence, wherein the dual-spectrum image camera is further provided with an infrared cutoff filter, and wherein the apparatus is disposed in the processor, and the apparatus comprises:

an original image acquisition module configured to acquire an original image collected by the image sensor;

a logical light splitting module configured to perform logical light splitting processing on the original image to obtain an infrared image and a visible light image;

a filter determination module configured to determine whether to use infrared cutoff filter;

a single-spectrum exposure control module configured to, if it is determined to use the infrared cutoff filter, perform exposure processing on the visible light image by using a single-spectrum exposure algorithm to obtain a visible light image that conforms to a target exposure effect; and a dual-spectrum exposure control module configured to, if it is determined not to use the infrared cutoff filter, perform the exposure processing on the infrared image and the visible light image by using a dual-spectrum exposure algorithm to obtain a visible light image that conforms to a first exposure effect and an infrared image that conforms to a second exposure effect, wherein the first exposure effect is the same as or different from the target exposure effect.

16. The camera of claim 15, wherein a lens is connected to the image sensor, wherein the lens is an infrared confocal lens.

17. The camera of claim 16, wherein a light transmittance of the lens is greater than a preset light transmittance.

18. The camera of claim 15, wherein the processor is further connected to a light filling device; and
   the light filling device comprises at least one of an infrared light filling lamp or a white light filling lamp.

19. The camera of claim 15, wherein the image sensor is an RGB-IR sensor.

20. A non-transitory machine storage medium, wherein the non-transitory machine storage medium stores machine-executable instructions, which when called and executed by a processor, cause the processor to perform the method of claim 1.

* * * * *